April 15, 1969    F. A. PICO    3,438,500
CENTRIFUGAL SEPARATING APPARATUS
Filed May 18, 1967

INVENTOR
FRANCISCO A. PICO
BY Shanley & O'Neil
ATTORNEYS

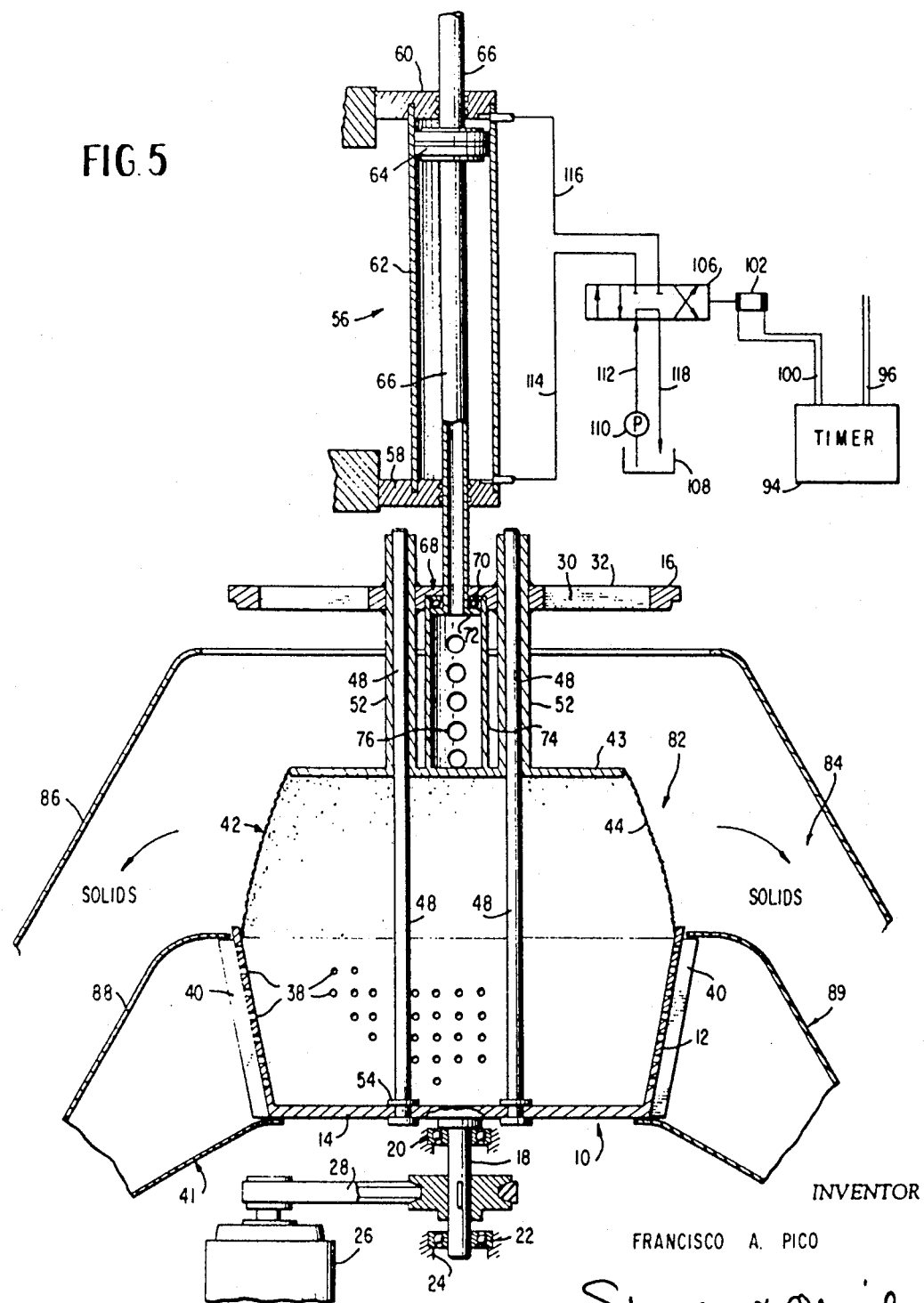

United States Patent Office 3,438,500
Patented Apr. 15, 1969

3,438,500
CENTRIFUGAL SEPARATING APPARATUS
Francisco A. Pico, Donato Guerra 2210,
Chihuahua, Chihuahua, Mexico
Filed May 18, 1967, Ser. No. 639,489
Int. Cl. B01d 33/0, 33/38
U.S. Cl. 210—213                    12 Claims

ABSTRACT OF THE DISCLOSURE

Apparatus for centrifugally separting the constituents of liquid-solid admixtures, including a rotary receptacle having vanes on an apertured end closure for impelling gas into the receptacle and vanes on perforated peripheral side walls for impelling fluid from the receptacle. The mixture is subjected to separating forces from forced gas circulation as well as from centrifugation. The mixture is carried in a filter container which is turned inside out to centrifugally discharge solids into a collecting duct, to permit continuous cyclic operation without stopping rotation of the receptacle.

Background of the invention

This invention pertains to centrifugal separating apparatus, and more particularly, to apparatus for centrifugally separating the constituents of mixtures of liquid and solid materials.

Many industrial processes include the separation of liquid from mixtures with solid materials. For example, particulate metal ores are often delivered to smelters in a watery slurry or other wet condition, and the water must be removed before the ore is smelted. Similarly, water or other liquid such as a treating liquor must often be removed from admixture with solids in the sugar, paper, coal and other industries.

The massive scale of contemporary industrial operations requires the rapid, efficient processing of large quantities of material and, although many forms of liquid-solid centrifugal separating apparatus have been proposed, a need still exists for separating apparatus which can process large amounts of material more rapidly, effectively, and efficiently than heretofore.

Prior art liquid-solid separating centrifuges have suffered from a number of disadvantages. One of these is relatively low efficiency, which results in extended drying periods or insufficient separation. Another problem is one of time lost while the centrifuge is loaded and unloaded by relativeiy slow techniques. The lack of continuity between cycles is related to the problem of low efficiency, because of the lost time and because additional energy must be consumed in stopping and restarting the centrifuge. Also, many prior art systems are not readily automated, which can be a severe handicap in present-day technology.

Accordingly, a main object of the invention is the provision of improved centrifugal separating apparatus capable of rapid, effective, efficient separation of liquid-solid admixtures.

Another object of the invention is the provision of improved centrifugal separating apparatus characterized by continuous rotation and rapid charging and discharging.

Still another object of the invention is the provision of improved centrifugal separating apparatus which is readily adaptable to fully automated operation.

Other objects of the invention, its features and advantages, will appear from the following detailed description which, when considered in connection with the accompanying drawings, discloses a preferred embodiment of the invention for purposes of illustration only and not for definition of the limits of the invention. For determining the scope of the invention, reference will be made to the appended claims.

Brief description of the drawings

In the drawings, wherein similar reference characters denote similar elements throughout the several views:

FIGURE 5 is a vertical cross-sectional view showing operation of the apparatus of FIGURE 1.

Description of the preferred embodiment

Figure 1:
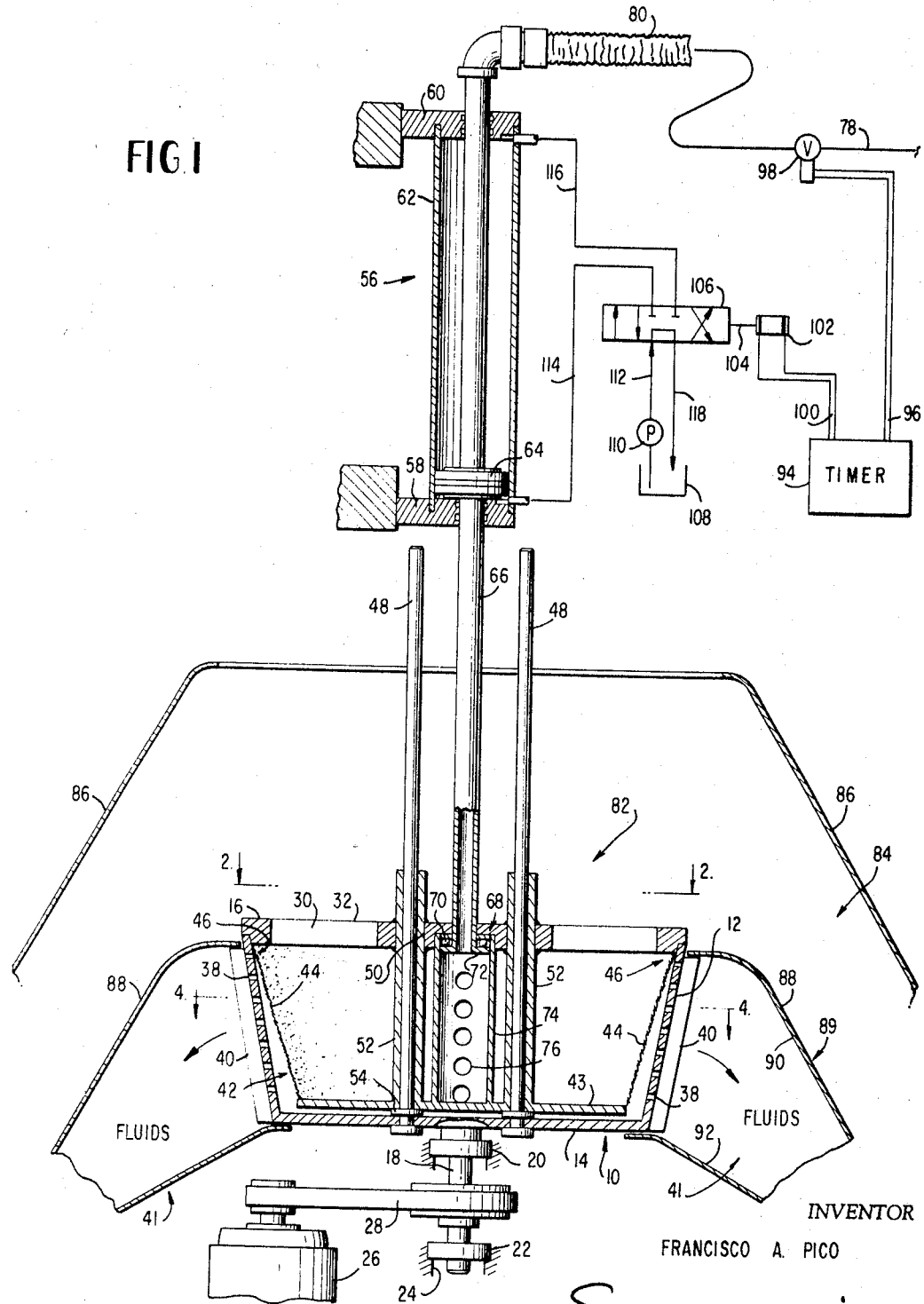
FIGURE 1 is a vertical cross-sectional view of apparatus forming a preferred embodiment of the invention.

FIGURE 1 depicts centrifugal separating apparatus comprising a receptacle 10 having peripheral side walls 12 and opposed end closures 14, 16. Receptacle 10 is mounted on stub shaft 18 for rotation about a vertical central axis passing through end closures 14, 16. Shaft 18 is carried in bearings 20, 22, which are mounted on a suitable base 24. Motor 26 rotates shaft 18 through a belt-and-pulley assembly 28.

Figure 2:
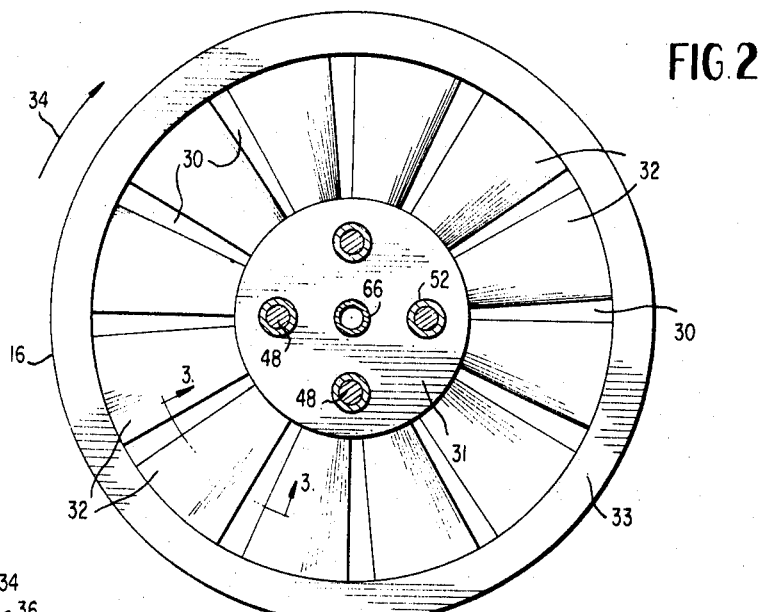
FIGURE 2 is a plan view on line 2—2 of FIGURE 1.
Figure 3:
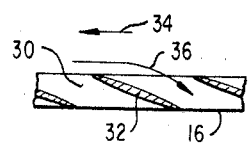
FIGURE 3 is a detail view on section line 3—3 of FIGURE 2.

A plurality of radially extending apertures 30 (see also FIGURES 2, 3) are formed in end closure 16. A plurality of radially extending vane members 32 are fixedly secured between radially spaced-apart hub portion 31 and rim portion 33 of end closure 16. The vanes are disposed angularly relative to the plane of the end closure so that, when the receptacle is rotated in the direction of arrows 34, the vanes impel ambient gas into receptacle 10 through apertures 30, as shown by directional arrow 36. Vanes 32 thus function as the blades of an axial-flow or propeller fan. The injected gas may be atmospheric air, or preheated air or other gas forced into the region immediately above vanes 32.

Figure 4:
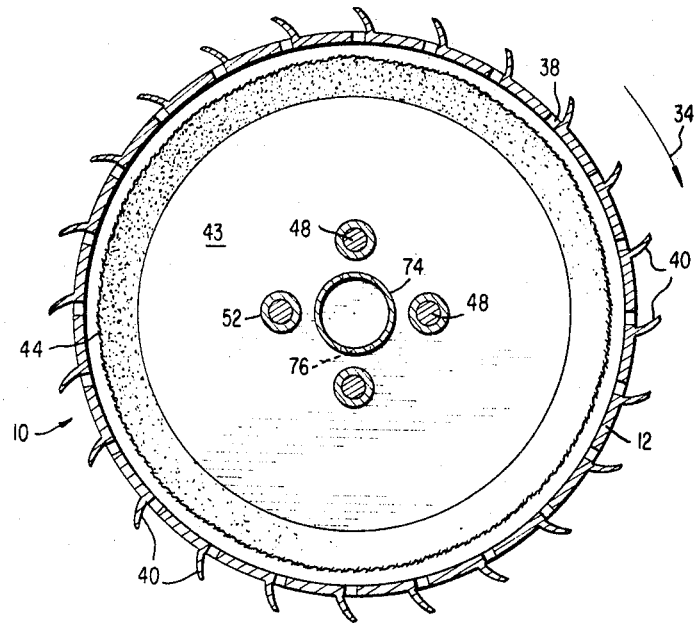
FIGURE 4 is a horizontal cross-sectional view on line 4—4 of FIGURE 1.

Perforations 38 (see FIGURES 1, 5) are formed in side walls 12 of receptacle 10. The perforations are formed over the entire expanse of the side walls. A plurality of vane members 40 (see also FIGURE 4), which are curved slightly in a direction opposite to the direction of rotation of the circular receptacle, are fixedly secured to the outside of side walls 12. The vanes extend axially relative to receptacle 10, and are disposed in mutually spaced-apart relationship around the circumference of the receptacle. Vanes 40 impel fluid from receptacle 10 through perforations 38 upon rotation of the receptacle. The vanes 40 function as the blades of a centrifugal-flow fan, tending to establish a reduced-pressure region interiorly of the receptacle, coacting with vanes 32 by decreasing pressure resistance to injection of gas into the receptacle by vanes 32, and thus improving forced-gas circulation through the receptacle. Extracted fluids (gas and separated liquid) are removed through duct 41, which has an annular inlet surrounding receptacle 10.

A filter container 42 including end closure 43 and peripheral side walls 44 is disposed in receptacle 10 in FIGURE 1. Side walls 44 are made of flexible, open-mesh material such as cloth or woven metal wire, and include upper peripheral end portions which are secured to the side walls 12 of receptacle 10 adjacent end closure 16, as is generally indicated at 46. The lower peripheral end portion of side walls 44 are secured to end closure 43.

A plurality of guide rod members 48 are secured to end closure 14 of receptacle 10 and extend axially relative to the receptacle through openings 50 in end closure 16. A plurality of tubular members 52 have their upper end portions secured to end closure 16 of receptacle 10 and their lower end portions secured to end closure 43 of filter container 42. The tubular members 52 slideably receive the guide rods 48. Spacer rings 54 on guide rods 48 support filter container end closure 43 on receptacle end closure 14. Guide rods 48 secure filter container 42 for rotation with receptacle 10, in addition to securing end closure 16 for rotation with the remainder of the receptacle structure and serving other purposes to appear. Tubular members 52 connect receptacle end closure 16 to filter container end closure 43, as well as functioning to receive the guide rods.

A fluid motor generally indicated at 56 is mounted on supports 58, 60 above receptacle 10 and includes a cylinder 62 and a piston 64. A tubular rod member 66 is secured to piston 64, extending longitudinally through cylinder 62. A coupling 68 including a bearing 70 rotatably mounts receptacle end closure 16 on rod 66, a flange 72 being provided at the lower extremity of rod 66 for this purpose. The upper end of a hollow member 74 is secured to receptacle end closure 16, circumscribing the lower end of rod 66 so that the open cross-section of hollow member 74 is in open fluid communication with the open cross-section of tubular piston rod 66. The lower end of hollow member 74 is secured to filter container end closure 43 to assist in connecting end closure 43 to receptacle end closure 16. A plurality of distributor orifices 76 are formed in the side walls of hollow member 74. Liquid-solid mixture to be centrifugally separated is conducted into filter container 42 in receptacle 10 from feed pipe 78 through a flexible hose 80, tubular rod 66, hollow member 74, and distributor orifices 76, which latter provide relatively uniform distribution of mixture about container 42.

A centrifuged solid material discharge station generally indicated at 82 is located axially relative to receptacle 10 adjacent end closure 16, and includes a duct 84 for collecting and removing discharged solid material. Duct 84 has an annular inlet surrounding discharge station 82 and includes spaced-apart outer and inner walls 86 and 88, respectively. Wall 86 terminates adjacent discharge station 82. Wall 88 is one face of a plate generally indicated at 89, which terminates in close proximity to side walls 12 of receptacle 10 adjacent receptacle end closure 16. The opposite face 90 of plate 89 forms one wall of fluid removal duct 41. Wall 92 of fluid removal duct 41, spaced from wall 90, terminates in close proximity to side walls 12 adjacent end closure 14. Duct 84 may conduct solids to a conveyor, hopper on other desired location, and duct 41 may conduct fluids to a tank, waste discharge, or elsewhere as desired.

Filter container 42 is everted, i.e., turned inside-out, to discharge centrifuged solid material into duct 84 at discharge station 82 by operation of fluid motor 56 to move piston rod 66 axially relative to receptacle 10. Since piston rod 66 is secured to filter container end closure 43 through receptacle end closure 16, tubular members 52, and hollow member 74, axial movement of rod 66 moves end closure 43 from the position shown in FIGURE 1 to the position shown in FIGURE 5, in which container 42 is everted. The centrifuged solids are spun off everted container 42 into duct 84 by centrifugal force, because receptacle 10 continues to rotate through the discharging portion of the centrifuging cycle. As piston rod 66 moves upwardly and downwardly, guide members 48 maintain the end closure 16 and filter container 42 in proper alignment relative to receptacle 10, imparting to the container 42 the rotary motion which spins the solid material into duct 84. The guide rods extend to a location above discharge station 82 for this purpose, since the receptacle end closure 16 must move through discharge station 82 so that container 42 can be everted to discharge into duct 84.

Fluid motor 56 is operated automatically by a timer 94, which may be any suitable type of conventional design. Timer 94 is operably connected through leads 96 to valve 98 in feed line 78, and through leads 100 to the coil 102 of a solenoid having a plunger 104 attached to a three-position, hydraulic fluid control valve 106. Hydraulic fluid from source 108 is elevated in pressure by pump 110 and passed through conduit 112. By manipulation of control valve 106, fluid may be selectively passed through conduit 114 or 116 to either side of the piston 64 in cylinder 62 of fluid motor 56, with the other side of the cylinder simultaneously being opened to drain conduit 118 so that the piston may be raised or lowered. Piston 64 is locked in the raised or lowered position by moving valve 106 to the position illustrated, in which hydraulic fluid can neither enter nor escape from any part of cylinder 62.

In operation, motor 26 is started with the apparatus in the position shown in FIGURE 1, to initiate rotation of the receptacle. Timer 94 is energized, and opens valve 98. Liquid-solid mixture to be centrifugally separated flows from feed line 78 through hose 80, tubular piston rod 66, hollow member 74 and distributor orifices 76 into filter container 42 in receptacle 10. After a predetermined charging time period, timer 94 automatically closes valve 98. The mixture in receptable 10 is centrifuged, with liquids being filtered through the mesh side walls 44 of container 42 and forced through perforations 38 in receptacle 10 by the combined actions of centrifugal force, pressurized gas injected into receptacle 10 by vanes 32 on end closure 16, and the suction effect established interiorly of the receptacle by vanes 40 on the receptacle side walls 12. At the end of a predetermined centrifuging time, timer 94 operates valve 106 to communicate conduit 114 with conduit 112, while communicating conduit 116 with drain conduit 118. Piston rod 66 is raised to and locked by valve 106 in the position shown in FIGURE 5, everting filter container 42. Since receptacle 10 continues to rotate, solid materials are discharged into duct 84 by centrifugal force. After a predetermined discharging time period, timer 94 operates valve 106 to communicate conduit 114 with drain conduit 118 while communicating conduit 116 with conduit 112, to lower piston rod 66 to and lock it in the piston shown in FIGURE 1. When this has occurred, timer 94 again opens valve 98 and the cycle is repeated.

Centrifugal separating apparatus described in the foregoing is highly advantageous. Liquid-solid mixtures are separated by the combined action of centrifugal force, pressurized gas injected into the receptacle by the vanes on the receptacle end closure, and the suction effect established inside the receptacle by the vanes on the receptacle side walls. This multiplicity of forces acting on the mixture creates more effective and more rapid separation of liquids from the mixture. Further, the plural separating forces have been generated from a single source 26 of motive power, enhancing the efficiency of the apparatus. The efficiency of the apparatus is further improved and its throughput capacity is increased by the charging and evertible container discharging features which permit continuous cyclic operation including loading and unloading while the receptacle is rotating. This avoids loss of time in charging and discharging and loss of energy in braking the centrifuge to a halt and restarting. Finally, the apparatus is readily adaptable for automated operation.

I claim:
1. Centrifugal separating apparatus, comprising
a receptacle having peripheral side walls and opposed first and second end closures,
the first end closure including means defining a plurality of apertures,
the side walls including means defining a plurality of perforations,
means mounting the receptacle for rotation about an axis passing through the end closures,
means for rotating the receptacle,
first vane means carried by the first end closure for impelling ambient gas into the receptacle through the apertures upon rotation of the receptacle,
and second vane means carried by the side walls for impelling fluid from the receptacle through the perforations in a radially outward direction relative to said axis upon rotation of the receptacle.

the second vane means including a plurality of vane members extending axially relative to the receptacle.

2. Centrifugal separating apparatus, comprising
a receptacle having peripheral side walls and opposed first and second end closures,
the first end closure including means defining a plurality of apertures,
the side walls including means defining a plurality of perforations,
means mounting the receptacle for rotation about an axis passing through the end closures,
means for rotating the receptacle,
first vane means carried by the first end closure for impelling ambient gas into the receptacle through the apertures upon rotation of the receptacle,
second vane means carried by the side walls for impelling fluid from the receptacle through the perforations upon rotation of the receptacle,
a filter container including
an end closure
and flexible open-mesh peripheral side walls having first and second end portions, the first end portion being secured to the side walls of the receptacle adjacent the first end closure of the receptacle, the second end portion being associated with the end closure of the filter container,
conduit means for conducting material to be centrifuged into the filter container,
a centrifuged solid material discharge station located axially relative to the receptacle adjacent the first end closure and including collecting means for collecting discharged solid material,
and everting means operatively associated with the filter container end closure for everting the filter container to discharge solid material into the collecting means at the discharge station.

3. Centrifugal separating apparatus as set forth in claim 2,
the everting means including
a rod member,
coupling means rotatably mounting the first end closure of the receptacle on the rod member,
connecting means attaching the first end closure of the receptacle to the end closure of the filter container, and
motive means for moving the rod member axially relative to the receptacle to evert the filter container.

4. Centrifugal separating apparatus as set forth in claim 3,
the rod member having an elongated open internal cross-section,
and the conduit means including the open cross-section of the rod member.

5. Centrifugal separating apparatus as set forth in claim 4, comprising
a hollow member secured to the first end closure of the receptacle and circumscribing the rod member and having an open internal cross-section in open fluid communication with the open cross-section of the rod member, the hollow member also having side walls and means defining a plurality of distributor-orifices in the side walls,
the conduit means including the open cross-section of the hollow member and the distributing orifices.

6. Centrifugal separating apparatus as set forth in claim 5,
the hollow member also being secured to the end closure of the filter container,
the connecting means including the hollow member.

7. Centrifugal separating apparatus as set forth in claim 3, comprising
a plurality of elongated guide members associated with the second end closure of the receptacle and extending axially relative to the receptacle through openings in the first end closure to a location spaced from the discharge station,
the connecting means including a plurality of tubular members each having one end portion secured to the end closure of the filter container and another end portion secured to the first end closure of the receptacle,
each tubular member slideably receiving a guide member.

8. Centrifugal separating apparatus as set forth in claim 3,
the motive means including a fluid motor having a cylinder and a piston movable in the cylinder,
the rod member being secured to the piston.

9. Centrifugal separating apparatus as set forth in claim 2, comprising
means defining a fluid removal duct having an annular inlet surrounding the receptacle and including a first wall terminating in close proximity to the side walls of the receptacle adjacent the first end closure and a second wall terminating in close proximity to the side walls of the receptacle adjacent the second end closure,
the collecting means including
means defining a solid material removal duct having an annular inlet surrounding the discharge station, and including a first wall terminating in close proximity to the side walls of the receptacle adjacent the first end closure and a second wall terminating adjacent the discharge station.

10. Centrifugal separating apparatus as set forth in claim 2,
the apertures extending radially relative to said axis,
the first vane means including a plurality of elongated vane members fixedly secured to the first end closure, extending radially relative to said axis, and disposed angularly relative to the plane of the first end closure, and
the second vane means including a plurality of second vane members fixedly secured to the outside of the side walls of the receptacle, extending axially relative to the receptacle, and disposed in mutually spaced-apart relationship around the periphery of the receptacle.

11. Centrifugal separating apparatus, comprising
a receptacle having peripheral side walls and opposed first and second end closures,
the first end closure including means defining a plurality of apertures,
the side walls including means defining a plurality of perforations,
means mounting the receptacle for rotation about an axis passing through the end closures,
means for rotating the receptacle,
first vane means carried by the first end closure for impelling ambient gas into the receptacle through the apertures upon rotation of the receptacle,
second vane means carried by the side walls for impelling fluid from the receptacle through the perforations upon rotation of the receptacle,
a filter container for lining the receptacle and including flexible, foraminous walls having a peripheral end portion secured to the receptacle,
means for conducting material to be centrifuged into the filter container,
means forming a centrifuged solid material discharge station located axially relative to the receptacle adjacent the first end closure, and
everting means operatively associated with the filter container for everting the filter container to discharge centrifuged solid material at the discharge station.

12. Centrifugal separating apparatus, comprising
a receptacle having peripheral side walls and opposed first and second end portions, means mounting the receptacle for rotation about an axis passing through the end portions, means for rotating the receptacle, a filter container for lining the receptacle and including flexible, foraminous walls having a peripheral end portion secured to the receptacle, means for conducting material to be centrifuged into the filter container, means forming a centrifuged solid material discharge station located axially relative to the receptacle adjacent the first end portion of the receptacle, and everting means operatively associated with the filter container for everting the filter container for centrifugal discharge of centrifuged solid material at the discharge station.

References Cited

UNITED STATES PATENTS

| | | | |
|---|---|---|---|
| 1,278,593 | 9/1918 | Clark et al. | 210—212 X |
| 1,602,463 | 10/1926 | Sparks et al. | 210—212 |
| 1,682,473 | 8/1928 | Bercaw | 210—213 X |
| 2,038,993 | 4/1936 | Erlanger | 210—237 |
| 3,276,594 | 10/1966 | Gwilliam | 210—356 X |

REUBEN FRIEDMAN, *Primary Examiner.*

J. L. DE CESARE, *Assistant Examiner.*

U.S. Cl. X.R.

210—237, 370, 377